(12) United States Patent
Liu et al.

(10) Patent No.: US 9,406,135 B2
(45) Date of Patent: Aug. 2, 2016

(54) DEVICE AND METHOD FOR ESTIMATING HEAD POSE

(71) Applicant: SAMSUNG ELECTRONICS CO., LTD., Suwon-si (KR)

(72) Inventors: Rong Liu, Beijing (CN); Maolin Chen, Beijing (CN); Fan Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/065,833

(22) Filed: Oct. 29, 2013

(65) Prior Publication Data

US 2014/0119655 A1 May 1, 2014

(30) Foreign Application Priority Data

Oct. 29, 2012 (CN) .......................... 2012 1 0420900
May 22, 2013 (KR) ........................ 10-2013-0057562

(51) Int. Cl.
*G06K 9/00* (2006.01)
*G06T 7/00* (2006.01)

(52) U.S. Cl.
CPC ............ *G06T 7/004* (2013.01); *G06K 9/00228* (2013.01); *G06T 2207/10028* (2013.01); *G06T 2207/20144* (2013.01); *G06T 2207/30196* (2013.01); *G06T 2207/30244* (2013.01)

(58) Field of Classification Search
CPC ............ G06K 9/00335; G06K 9/346; G06K 9/00228; G06T 17/20; G06T 7/0075; G06T 2207/10021; G06T 2207/10024; G06T 7/004; G06T 2207/10028; G06T 2207/20144; G06T 2207/30196; G06T 2207/30244; H04N 13/0239

USPC .................. 382/118, 154, 103, 173; 348/50, 348/E13.074, E13.004
See application file for complete search history.

(56) References Cited

U.S. PATENT DOCUMENTS

| | | | | |
|---|---|---|---|---|
| 6,738,516 | B1 * | 5/2004 | Kondo et al. | 382/190 |
| 7,218,760 | B2 * | 5/2007 | Gu | G06K 9/00281 382/118 |
| 7,796,822 | B2 * | 9/2010 | Steinberg | G06K 9/0061 382/224 |
| 8,708,491 | B2 * | 4/2014 | Frey et al. | 351/206 |
| 2003/0012408 | A1 | 1/2003 | Bouguet et al. | |
| 2004/0264745 | A1 * | 12/2004 | Gu et al. | 382/118 |

(Continued)

FOREIGN PATENT DOCUMENTS

| KR | 10-0474837 | 3/2005 |
|---|---|---|
| KR | 10-0922429 | 10/2009 |

OTHER PUBLICATIONS

Ji et al.,"3D Face pose estimation and tracking from a monocular camera", Elsevier, published 2002, 13 page.*

(Continued)

*Primary Examiner* — Mekonen Bekele
(74) *Attorney, Agent, or Firm* — NSIP Law

(57) ABSTRACT

Provided is a device and method for estimating a head pose which may obtain an excellent head pose recognition result free from the influence of an illumination change, the device including a head area extracting unit to extract a head area from an input depth image, a head pitch angle estimating unit to estimate a pitch angle of a head in the head area, a head yaw angle estimating unit to estimate a yaw angle of the head in the head area, and a head pose displaying unit to display a head pose based on the estimated pitch angle of the head and the estimated yaw angle of the head.

16 Claims, 12 Drawing Sheets

(56) References Cited

U.S. PATENT DOCUMENTS

| | | | |
|---|---|---|---|
| 2010/0189313 A1* | 7/2010 | Prokoski | 382/118 |
| 2010/0197399 A1 | 8/2010 | Geiss | |
| 2010/0293635 A1* | 11/2010 | Stelpflug | A01H 5/10 800/263 |
| 2011/0043610 A1 | 2/2011 | Ren et al. | |
| 2011/0110585 A1 | 5/2011 | Kang et al. | |
| 2011/0249190 A1* | 10/2011 | Nguyen | H04N 5/272 348/708 |
| 2011/0274314 A1* | 11/2011 | Yang et al. | 382/103 |
| 2012/0293635 A1* | 11/2012 | Sharma | G06K 9/00234 348/50 |
| 2012/0308116 A1* | 12/2012 | Eichorn | G06K 9/00335 382/154 |
| 2015/0009207 A1* | 1/2015 | Guo | G06T 15/00 345/419 |

OTHER PUBLICATIONS

Gabriele Fanelli et al., "Real Time 3D Head Pose Estimation: Recent Achievements and Future Challenges", Proceedings of the 5th International Symposium on Communications, Control and Signal Processing, May 2-4, 2012, pp. 4.*

Ji et al.,"3D Face pose estimation and tracking from a monocular camera", Elsevier, published 2002, 13 pages.*

Gabriele Fanelli et al., "Real Time 3D Head Pose Estimation: Recent Achievements and Future Challenges", Proceedings of the 5th International Symposium on Communications, Control and Signal Processing, May 2-4, 2012, 4 pages.*

* cited by examiner

DEVICE AND METHOD FOR ESTIMATING HEAD POSE

CROSS-REFERENCE TO RELATED APPLICATIONS

This application claims priority to Chinese Patent Application No. 201210420900.2, filed on Oct. 29, 2012, and Korean Patent Application No. 10-2013-0057562, filed on May 22, 2013, in the Korean Intellectual Property Office, the disclosures of which are incorporated herein by reference.

BACKGROUND

1. Field

Embodiments disclosed herein relate to a technique for estimating a head pose of a human body, and more particularly, to a device and method for estimating a head pose based on a depth image.

2. Description of the Related Art

With the development of computer vision and model recognition technology, body pose recognition technology is being widely used in a number of fields. For example, body pose recognition technology may be used in human computer interaction (HCI) for more intuitive manipulation of a device. Also, an HCI method based on head pose recognition technology may enhance a level of player enjoyment in a virtual gaming environment, and reflect a point of interest of a user in a safe driving system. Also, a result of head pose recognition may be used in a head moving animation and to achieve natural three-dimensional (3D) interoperation. In most cases, line of sight detection is a salient key point in executing HCI, and head pose recognition is a basis for line of sight detection. Also, a result of head pose recognition may be used as a weighted reference for line of sight detection.

In general, head pose recognition technology recognizes a head pose using a color or infrared image.

SUMMARY

The foregoing and/or other aspects are achieved by providing a device and method for estimating a head pose that may recognize a head pose effectively free from the influence of a change in illumination.

The example embodiments may include a device for estimating a head pose that may include a head area extracting unit to extract a head area from an input depth image, a head pitch angle estimating unit to estimate a pitch angle of a head in the head area, a head yaw angle estimating unit to estimate a yaw angle of the head in the head area, and a head pose displaying unit to display a head pose based on the estimated pitch angle of the head and the estimated yaw angle of the head.

The head area extracting unit may include a head detecting unit to detect the head area from the input depth image based on a depth feature of the head, a background removing unit to remove a background from the detected head area, and a head area elaboration processing unit to perform elaboration processing of the background part-removed head area based on an outline feature of the head.

The head pitch angle estimating unit may include a pitch line extracting unit to extract a pitch line of the head indicating a depth of the head along a vertical direction in the head area, a fitting unit to fit the extracted pitch line of the head to a straight line, and a pitch angle calculating unit to calculate an angle at which the straight line is offset from a vertical direction (an angle between the straight line and a vertical line) and set the calculated angle to be the pitch angle of the head.

The fitting unit may classify the pitch line of the head into a plurality of sections, and may obtain the straight line in a section having a highest fitting probability based on a RANdom Sample Consensus (RANSAC) algorithm.

The head yaw angle estimating unit may include a yaw line extracting unit to extract a yaw line of the head indicating a depth of the head along a horizontal direction in the head area, and a yaw angle calculating unit to obtain a yaw angle of the head by determining a degree of deviation a depth of focus from a center of the head based on the yaw line of the head.

The head pose displaying unit may obtain a corresponding three-dimensional (3D) head pose by operating a 3D model in a pitch direction or a yaw direction based on the pitch angle of the head and the yaw angle of the head.

The example embodiments may also include a method of estimating a head pose that may include extracting a head area from an input depth image, estimating a pitch angle of a head in the head area, estimating a yaw angle of the head in the head area, and displaying a head pose based on the estimated pitch angle of the head and the estimated yaw angle of the head.

The extracting of the head area may include detecting the head area from the input depth image based on a depth feature of the head, removing a background part from the detected head area, and performing elaboration processing of the background part-removed head area based on an outline feature of the head.

The estimating of the pitch angle of the head may include extracting a pitch line of the head indicating a depth of the head along a vertical direction in the head area, fitting the extracted pitch line of the head to a straight line, and calculating an angle at which the straight line is offset from a vertical direction and setting the calculated angle to be the pitch angle of the head.

The fitting of the extracted pitch line of the head to the straight line may include classifying the pitch line of the head into a plurality of sections, and obtaining the straight line in a section having a highest fitting probability based on an RANSAC algorithm.

The estimating of the yaw angle of the head may include extracting a yaw line of the head indicating a depth of the head along a horizontal direction in the head area, and obtaining a yaw angle of the head by determining a degree of deviation of a depth of focus from a center of the head based on the yaw line of the head.

The displaying of the head pose based on the estimated pitch angle of the head and the estimated yaw angle of the head may include obtaining a corresponding 3D head pose by operating a 3D model in a pitch direction or a yaw direction based on the pitch angle of the head and the yaw angle of the head.

According to the device and method, a head pose may be estimated based on a depth image, free from the influence of an illumination change. Also, an excellent result of recognition may be obtained by operating a 3D model using a head pitch angle and a head yaw angle, an accurately recognized pose may be obtained even in a case in which a distance is long or a resolution is reduced. Also, according to the exemplary embodiments, an amount of calculation may be reduced to meet demands in real time.

Example embodiments may include a head pose estimating apparatus that includes a processor to control one or more processor-executable units, head pitch angle estimating unit to estimate a pitch angle of a head in a head area, a head yaw angle estimating unit to estimate a yaw angle of the head in the head area, and a head pose displaying unit to display a three-dimensional (3D) head pose by operating a 3D model in a pitch direction and a yaw direction based on the pitch angle of the head estimated by the head pitch angle estimating unit and the yaw angle of the head estimated by the head yaw angle estimating unit.

The head area of the head pose estimating apparatus may be extracted from an input depth image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings.

Figure 1:
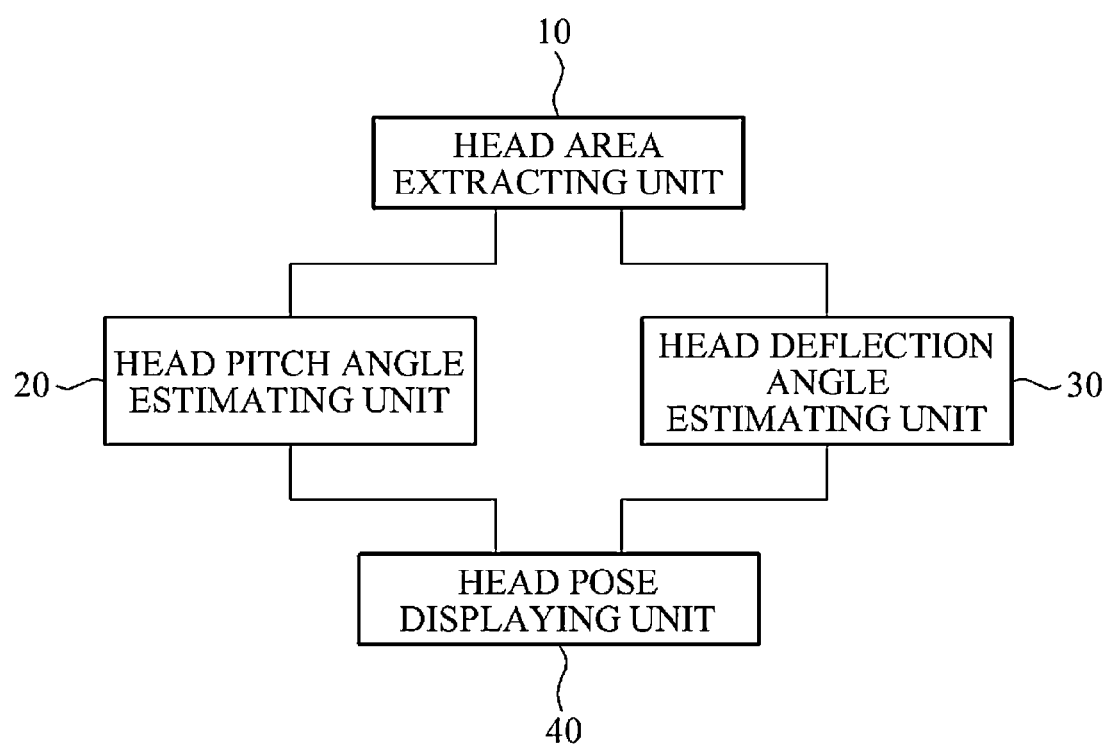
FIG. 1 is a block diagram illustrating a device for estimating a head pose according to an exemplary embodiment.

FIG. 1 is a block diagram illustrating a device for estimating a head pose according to an exemplary embodiment. As shown in FIG. 1, the device for estimating a head pose according to an exemplary embodiment may include, for example, a head area extracting unit 10 to extract a head area from an input depth image, a head pitch angle estimating unit 20 to estimate a pitch angle of a head in the head area, a head yaw angle estimating unit 30 to estimate a yaw angle of the head in the head area, a head pose displaying unit 40 to display a head pose based on the estimated pitch angle of the head and the estimated yaw angle of the head. Here, the input depth image may be generated through a photographing device such as, for example, a camera including a time-of-flight (TOF) camera or a camera based on structured light. Also, according to an exemplary embodiment, when photographing a depth image, a model to be photographed need not assume a special pose or expression nor be located a predetermined distance away from a photographing device. It is also unnecessary to photograph a user in front of a special background screen.

The head pose may be primarily represented by head pitching and head yaw. Accordingly, the pitch angle of the head and the yaw angle of the head may be estimated in the head area of the depth image, respectively. Here, the corresponding head pose may be displayed based on the estimated pitch angle and the estimated yaw angle.

Hereinafter, an example of estimating a head pose using the device for estimating a head pose according to an exemplary embodiment is described with reference to FIG. 2.

Figure 2:
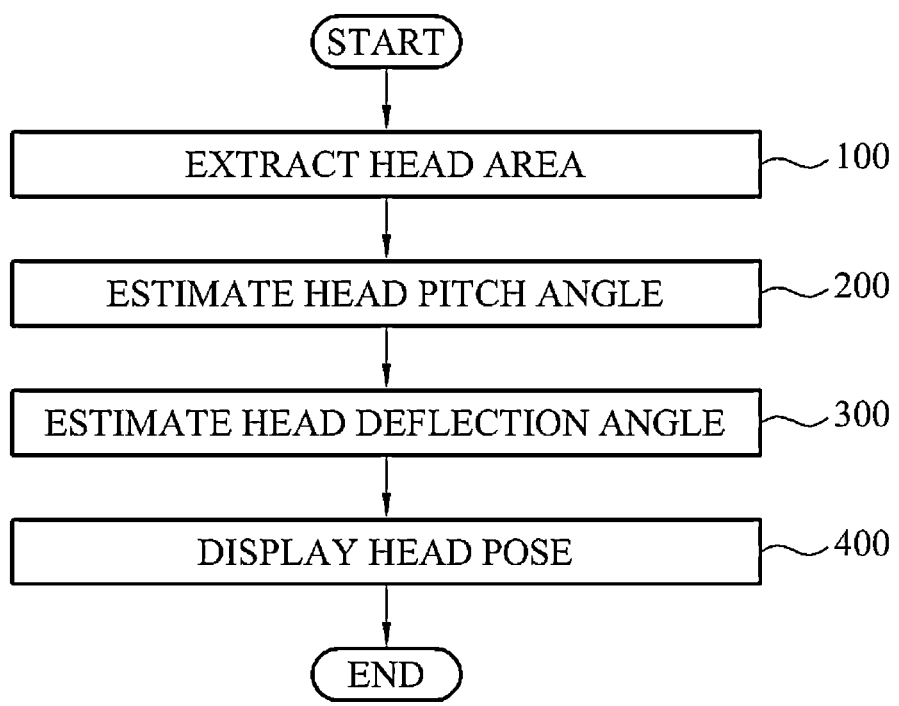
FIG. 2 is a flowchart illustrating a method of estimating a head pose according to an exemplary embodiment.

FIG. 2 is a flowchart illustrating a method of estimating a head pose according to an exemplary embodiment.

As shown in FIG. 2, in operation 100, a head area may be extracted from an input depth image using the head area extracting unit 10.

Figure 3:
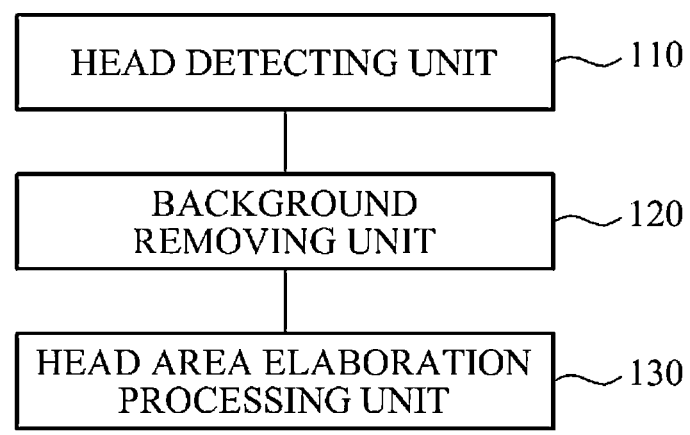
FIG. 3 is a block diagram illustrating a head area extracting unit according to an exemplary embodiment.

For example, FIG. 3 is a block diagram illustrating the head area extracting unit 10 according to an exemplary embodiment. As shown in FIG. 3, the head area extracting unit 10 may include a head detecting unit 110 to detect the head area from the input depth image based on a depth feature of the head. In this example, the head detecting unit 110 may detect the head area based on a training sample of a head feature.

The head area extracting unit 10 may further include a background removing unit 120 to remove a background part from the detected head area. In particular, the background removing unit 120 may obtain a head area located in a foreground by removing the background part from the head area based on a depth difference between the head and the background part, because a depth of the background part and a depth of a foreground differs in the depth image.

To detect the head area accurately, the head area extracting unit 10 may further include a head area elaboration processing unit 130 to perform elaboration processing of the background part-removed head area, based on an outline feature of the head. Generally, the head area elaboration processing unit 130 may locate both the sides and the top of the head in the head area along the outline feature of both the sides and the top of the head, and consequently, may locate a bottom of the head based on a depth difference from the head to the body because an outline of both the sides and top of the head in the human body has a common shape feature and a depth of a lower part in the head, for example, a lower jaw differs from a depth of an adjacent body part.

In summary, a method of detecting the head area from the input depth image using the head area extracting unit 10 has just been described with reference to FIG. 3.

Figure 4:
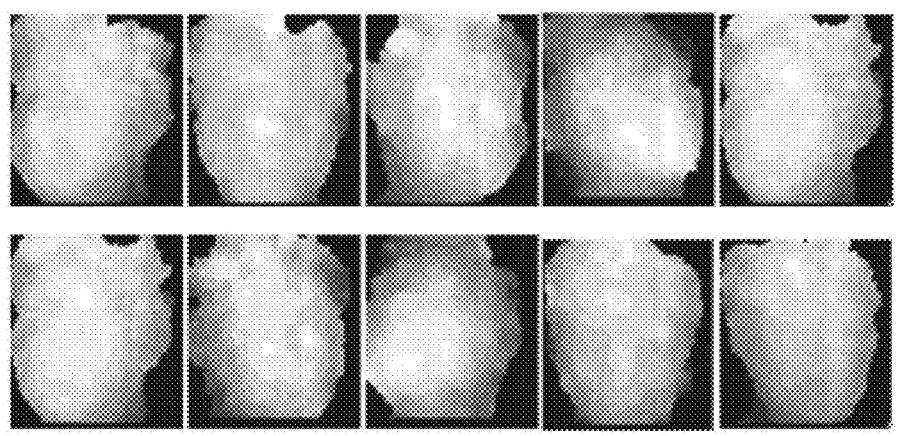
FIG. 4 illustrates an extracted head area according to an exemplary embodiment.

FIG. 4 illustrates the extracted head area according to an exemplary embodiment. Here, the head area extracting unit 10 according to an exemplary embodiment is not limited to the above structure and operations. Any method of detecting a head area in an input depth image for resolving technical issues may be applicable to exemplary embodiments.

Referring to FIG. 2 again, in operation 200, the head pitch angle estimating unit 20 may estimate a pitch angle of the head in the head area.

Figure 5:
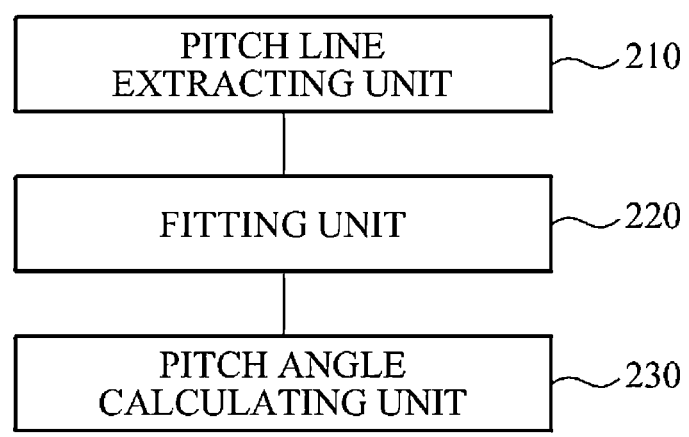
FIG. 5 is a block diagram illustrating a head pitch angle estimating unit according to an exemplary embodiment.

By way of illustrative example, FIG. 5 is a block diagram illustrating the head pitch angle estimating unit 20 according to an exemplary embodiment. As shown in FIG. 5, the head pitch angle estimating unit 20 may include a pitch line extracting unit 210 to extract a pitch line of the head indicating a depth of the head along a vertical direction in the head area, a fitting unit 220 to fit the extracted pitch line of the head to a straight line, and a pitch angle calculating unit 230 to calculate an angle at which the straight line is offset from a vertical direction and set the calculated angle to be a pitch angle of the head.

According to an exemplary embodiment, the head pose may be classified into head pitching and head yaw. As used herein, head pitching refers to a raising or lowering motion of the head, and the head yaw represents a head turning motion. By placing the human body in a direction facing the camera when photographing the depth image, the head pitching may cause a depth change along the vertical direction, for example, along a Y axis, and the head yaw may cause a depth change along the horizontal direction, for example, along an X axis. Also, a Z axis may be used to represent a depth direction.

For example, the pitch line extracting unit 210 may extract a pitch line of the head in the head area. Here, the pitch line of the head may indicate a depth of the head along the vertical direction. In an exemplary embodiment, when the pitch line of the head is extracted, the pitch line extracting unit 210 may only extract a depth of the head along the vertical direction in the head area of a three-dimensional (3D) space and a depth change of the head along a yaw direction, that is, along the X-axis, may be disregarded. For example, the pitch line extracting unit 210 may map the 3D head area to a Y-Z plane. Here, the Y axis may represent the vertical direction of the head, and the Z axis may represent the depth direction of the head. For example, with respect to an arbitrary point (y,z) on the pitch line of the head, the pitch line extracting unit 210 may set, to a depth z, a greatest depth corresponding to y in the horizontal direction in the 3D head area. Alternatively, the pitch line extracting unit 210 may set, to a depth z, an average depth corresponding to a depth y in the horizontal direction in the 3D head area, to obtain a flatter head pitch line.

Figure 6:
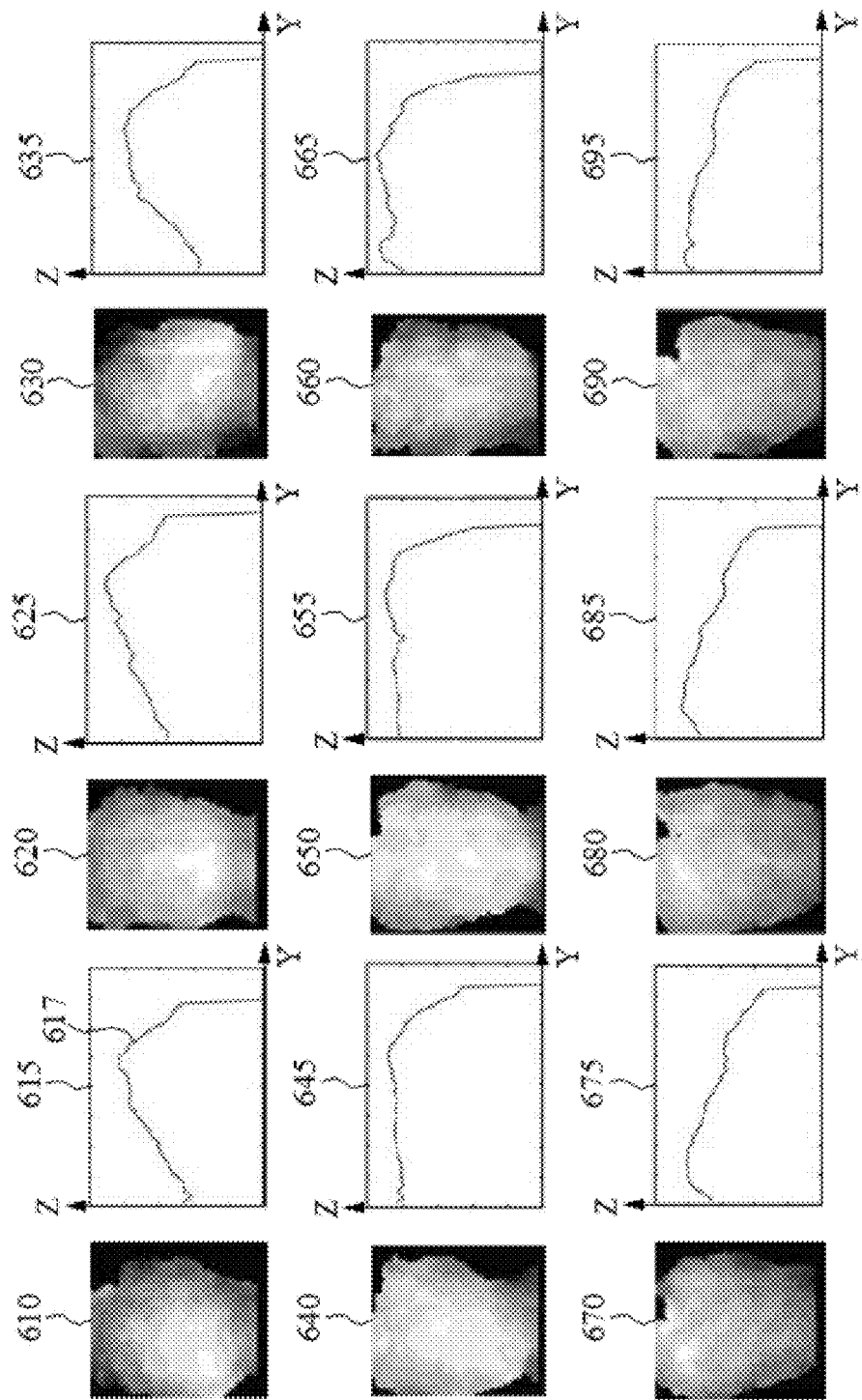
FIG. 6 illustrates an extracted head pitch line according to an exemplary embodiment.

FIG. 6 illustrates the extracted head pitch line according to an exemplary embodiment.

In FIG. 6, depth images 610, 620, and 630 in a first row correspond to a case in which the head is raised, depth images 640, 650, and 660 in a second row correspond to a case in which the head looks straight ahead, and depth images 670, 680, and 690 in a third row correspond to a case in which the head is lowered.

In FIG. 6, depth images 610, 640, and 670 in a first column corresponds to a case in which the head is deflected in a rightward direction, depth images 620, 650, and 680 in a second column corresponds to a case in which the head looks straight, that is, without being deflected in a leftward direction or in a rightward direction, and depth images 630, 660, and 690 in a third column corresponds to a case in which the head is deflected in a leftward direction.

Accordingly, the depth image 610 corresponds to a case in which the head is raised while being deflected in a rightward direction. The depth image 620 corresponds to a case in which the head is raised while looking straight without being deflected in a leftward direction or in a rightward direction. The depth image 630 corresponds to a case in which the head is raised while being deflected in a leftward direction. The depth image 640 corresponds to a case in which the head looks ahead, that is, in which the head is neither raised nor lowered and is thus parallel to the horizon, while being deflected in a rightward direction. The depth image 650 corresponds to a case in which the head looks ahead, that is, without being raised or lowered, and straight, that is, without being deflected in a leftward direction or in a rightward direction. The depth image 660 corresponds to a case in which the head looks ahead while being deflected in a leftward direction. The depth image 670 corresponds to a case in which the head is lowered while being deflected in a rightward direction. The depth image 680 corresponds to a case in which the head is lowered while looking straight without being deflected in a leftward direction or in a rightward direction. The depth image 690 corresponds to a case in which the head is lowered while being deflected in a leftward direction.

In FIG. 6, a graph 615 represents a head pitch line 617 corresponding to the depth image 610. A graph 625 represents a head pitch line corresponding to the depth image 620. A graph 635 represents a head pitch line corresponding to the depth image 630. A graph 645 represents a head pitch line corresponding to the depth image 640. A graph 655 represents a head pitch line corresponding to the depth image 650. A graph 665 represents a head pitch line corresponding to the depth image 660. A graph 675 represents a head pitch line corresponding to the depth image 670. A graph 685 represents a head pitch line corresponding to the depth image 680. A graph 695 represents a head pitch line corresponding to the depth image 690.

Accordingly, the graphs 615, 625, and 635 in the first row represent the head pitch line corresponding to the depth images 610, 620, and 630 in which the head is raised, respectively. The graphs 645, 655, and 665 in the second row represent the head pitch line corresponding to the depth images 640, 650, and 660 in which the head looks ahead, respectively. The graphs 675, 685, and 695 in the third row represent the head pitch line corresponding to the depth images 670, 680, and 690 in which the head is lowered, respectively.

As shown in FIG. 6, the graphs 615, 625, and 635 in the first row represent the extracted head pitch line when the head is raised, and demonstrate that the depth increases along the Y axis, for example, a distance between a forehead and the photographing device being longer than a distance between a lower jaw and the photographing device. In the graphs 615, 625, 635, 645, 655, 665, 675, 685, and 695 of FIG. 6, the Y axis denotes the vertical direction of the head, and the Z axis denotes the depth value. A smaller value of the Y axis represents a downward direction with respect to the vertical direction of the head, for example, a direction facing the lower jaw, and a larger value of the Y axis represents an upward direction with respect to the vertical direction, for example, a direction facing the forehead. In FIG. 6, the graphs 615, 625, and 635 in the first row correspond to a case in which the head is raised, and represent a larger depth value along the Y axis. For example, in a case in which the head is raised, the depth value is increased as the value of the Y axis is increased. In a case in which the head is raised, a distance from the photographing device is increased in an upward direction with respect to the vertical direction of the head.

In this instance, referring to the graphs 615, 625, and 635, it may be found that the head pitch line changes modestly with the leftward or rightward yaw of the head.

The graphs 645, 655, and 665 in the second row represent the extracted head pitch line when the head looks ahead, and demonstrate that the depth changes modestly along the Y axis, for example, that the forehead and the lower jaw are in the same plane. The graphs 675, 685, and 695 in the third row represent the extracted head pitch line when the head is lowered, and demonstrate that the depth value is reduced along the Y axis, for example, that the forehead is closer to the photographing device than the lower jaw.

When the head pitch line is extracted, the fitting unit 220 may fit the extracted head pitch line to a straight line. Here, a head pitch angle may represent an intersection angle between a face plane and a body plane, and the fitting unit 220 may fit the face plane to a straight line in the Y-Z plane, and an intersection angle between the straight line and the Y axis may represent an intersection angle between the face plane and the body plane, for example, a head pitch angle.

The fitting unit 220 may fit the head pitch line to the straight line using an arbitrary suitable method, for example, a least squares method. Here, in an exemplary embodiment, fitting may be performed through the fitting unit 220 using a RANdom Sample Consensus (RANSAC) algorithm while taking a curve of the lower jaw and the forehead into consideration to obtain an optimum fitting effect.

Hereinafter, processing of the fitting unit 220 fitting the extracted head pitch line to the straight line using the RANSAC algorithm is described. In particular, use of the RANSAC algorithm may be suitable for this situation because the curve of the lower jaw and the forehead is an incidental part when an overall face area is taken into consideration.

First, the fitting unit 220 may extract N fitting line sampling points from the head pitch line. Here, N denotes a positive integer. Subsequently, assuming that the fitting line is $ay+bz+c=0$, the fitting unit 220 may calculate a distance between each sampling point $(y_n, z_n)$ and the assumed fitting line $(ay+bz+c=0)$, in which n denotes a sequence of sampling points, $1 \leq n \leq N$. When the distance is less than a preset threshold value $T_{dis}$, the corresponding sampling point $(y_n, z_n)$ may be set to an valid sampling point, and when the distance is greater than or equal to the preset threshold value $T_{dis}$, the corresponding sampling point $(y_n, z_n)$ may be set to an invalid sampling point. A value of $T_{dis}$ may be determined through experience or experiment. Accordingly, the fitting unit 220 may determine the distance DS, between the sampling point $(y_n, z_n)$ and the assumed fitting line based on Equation 1.

$$DS_n = \begin{cases} |ay_n + bz_n + c|/\sqrt{a^2+b^2} & |ay_n + bz_n + c|/\sqrt{a^2+b^2} < T_{dis} \\ T_{dis} & |ay_n + bz_n + c|/\sqrt{a^2+b^2} \geq T_{dis} \end{cases}$$ [Equation 1]

As described in the foregoing, when the distance DSn between each sampling point and the assumed fitting line is determined, the fitting unit 220 may calculate a fitting probability P of the assumed fitting line based on Equation 2.

$$P = \frac{N \cdot T_{dis} - \sum_{n=1}^{N} DS_n}{N \cdot T_{dis}}$$ [Equation 2]

Through the foregoing method, the fitting unit 220 may determine an assumed fitting line $(ay+bz+c=0)$ having a highest fitting probability P to be a fitting straight line representing a head pitch line.

Also, sections classified by the pitch line have different roles for different head poses. As shown in FIG. 6, with respect to a head raising pose, an improved calculation effect may be obtained using a section of the pitch line located higher than the head, and with respect to a head lowering pose, a better calculation effect may be obtained using a section of the pitch line located lower than the head. Accordingly, the fitting unit 220 may fit the extracted head pitch line to the straight line in a manner of sectioning and fitting. For example, the fitting unit 220 may classify the head pitch line into a plurality of sections, select a section having a highest fitting probability, and determine the selected section to be a fitting straight line representing a head pitch line.

When the extracted head pitch line is fitted to the straight line by the fitting unit 220, the pitch angle calculating unit 230 may calculate an angle at which the straight line is offset from the vertical direction, and may set the calculated angle to be a head pitch angle.

Figure 7:
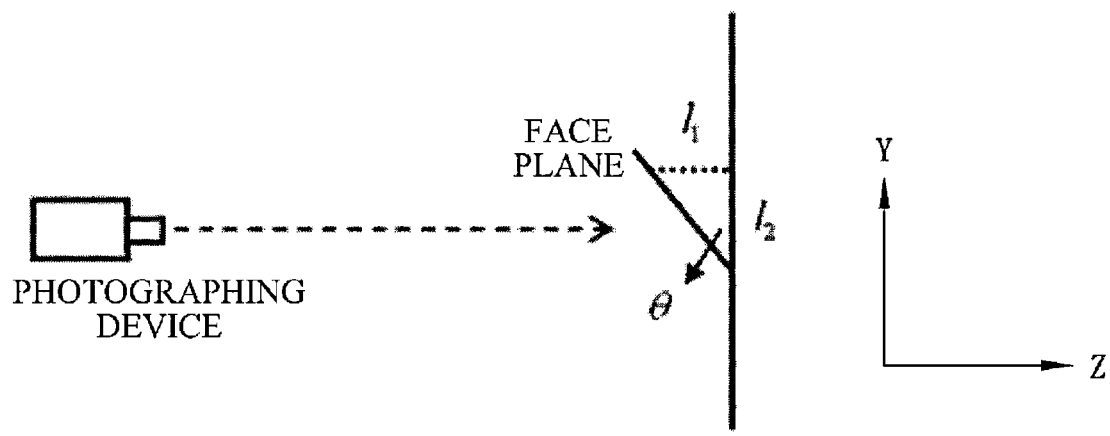
FIG. 7 illustrates an example of calculating a head pitch angle according to an exemplary embodiment.

Hereinafter, a processing operation of the pitch angle calculating unit 230 calculating a head pitch angle is described with reference to FIG. 7. FIG. 7 illustrates an example of calculating a head pitch angle according to an exemplary embodiment.

As shown in the example of FIG. 7, the head pitch angle θ represents an intersection angle between the face plane, for example, the fitting line, and the body plane, for example, the Y axis. In this case, the pitch angle calculating unit 203 may calculate the head pitch angle θ based on Equation 3.

$$\theta = a c \tan\left(\frac{l_1}{r \cdot l_2}\right)$$ [Equation 3]

Here, $l_1$ denotes a depth difference between an upper part and a lower part of the face. For example, $l_1$ may denote a difference between a greatest depth and a smallest depth on the fitting line. $l_2$ denotes a distance between the upper part and the lower part of the face. For example, $l_2$ may denote a length of the face. Here, when a depth of an object being photographed is obtained, the depth is generally represented by a physical depth, and the distance between the upper part and the lower part of the face in the image is represented by a pixel distance. In this case, the depth and the face length may have different units of measure. Accordingly, a unit of measure of inconsistency between the depth and the face length may be resolved using a scaling factor r. However, in a case in which an image with a face length represented by a physical distance may be obtained directly from a depth camera, a need for the scaling factor r may be eliminated or the scaling factor r may be set to 1.

The pitch angle calculating unit 230 may correct the calculated head pitch angle. In this instance, due to a curve of a part, for example, a nose and the like, even though the head looks ahead, it is difficult to obtain a perfectly perpendicular fitting line in the face and there is a predetermined offset. Accordingly, the pitch angle calculating unit 230 may add an offset angle $\theta_{comp}$ to the calculated pitch angle θ, and may correct the head pitch angle. The offset angle $\theta_{comp}$ may be used to correct an offset angle of a face curve. Also, the offset angle $\theta_{comp}$ may be set to a particular value based on experience or through experimentation.

The head pitch angle estimating unit 20 is not limited to the above detailed structure and operation. Any method of estimating a head pitch angle in a head area for resolving a technical issue may be applicable to exemplary embodiments.

Referring to FIG. 2 again, in operation 300, the head yaw angle estimating unit 30 of FIG. 1 may estimate a head yaw angle in the head area.

Figure 8:
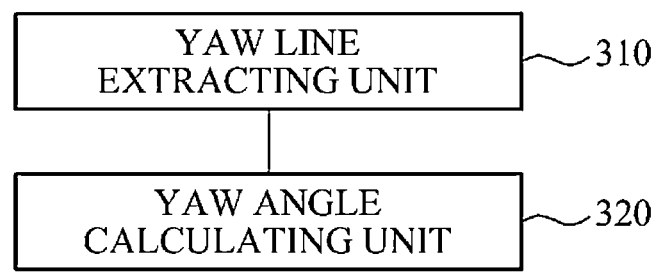
FIG. 8 is a block diagram illustrating a head yaw angle estimating unit according to an exemplary embodiment.

For example, FIG. 8 is a block diagram illustrating the head yaw angle estimating unit 30 according to an exemplary embodiment. As shown in FIG. 8, the head yaw angle estimating unit 30 may include a yaw line extracting unit 310 to extract a yaw line of the head indicating a depth of the head along the horizontal direction in the head area, and a yaw angle calculating unit 320 to obtain a head yaw angle by determining a degree of deviation of a depth of focus from a center of the head based on the yaw line of the head.

Here, due to a spatial location relationship of the head and the photographing device, estimating the head yaw angle using the same method as the head pitch angle is difficult. Accordingly, in an exemplary embodiment, when the yaw line of the head indicating a depth of the head along the horizontal direction is determined, the head yaw angle may be obtained by determining a degree of deviation of the depth of focus from the center of the head based on the yaw line of the head. Due to yaw of the head, the degree of deviation of the depth of focus from the center of the head is determined based on a size of the head yaw angle.

The yaw line extracting unit 310 may extract the head yaw line in the head area. For example, when the head yaw line is extracted, the yaw line extracting unit 310 may only extract a depth of the head along the horizontal direction in the head area of a 3D space and may thereby disregard a depth change of the head along the vertical direction. The yaw line extracting unit 310 may map a 3D head area to an X-Z plane, in which the X axis may represent the horizontal direction of the head and the Z axis may represent the depth direction of the head. With respect to an arbitrary point (x,z) on the head yaw line, the yaw line extracting unit 310 may set, to a depth z, a greatest depth corresponding to x in the vertical direction in the 3D head area. Alternatively, the yaw line extracting unit 310 may set, to a depth z, an average depth corresponding to x in the vertical direction in the 3D head area, to obtain a flatter head yaw line.

Figure 9:
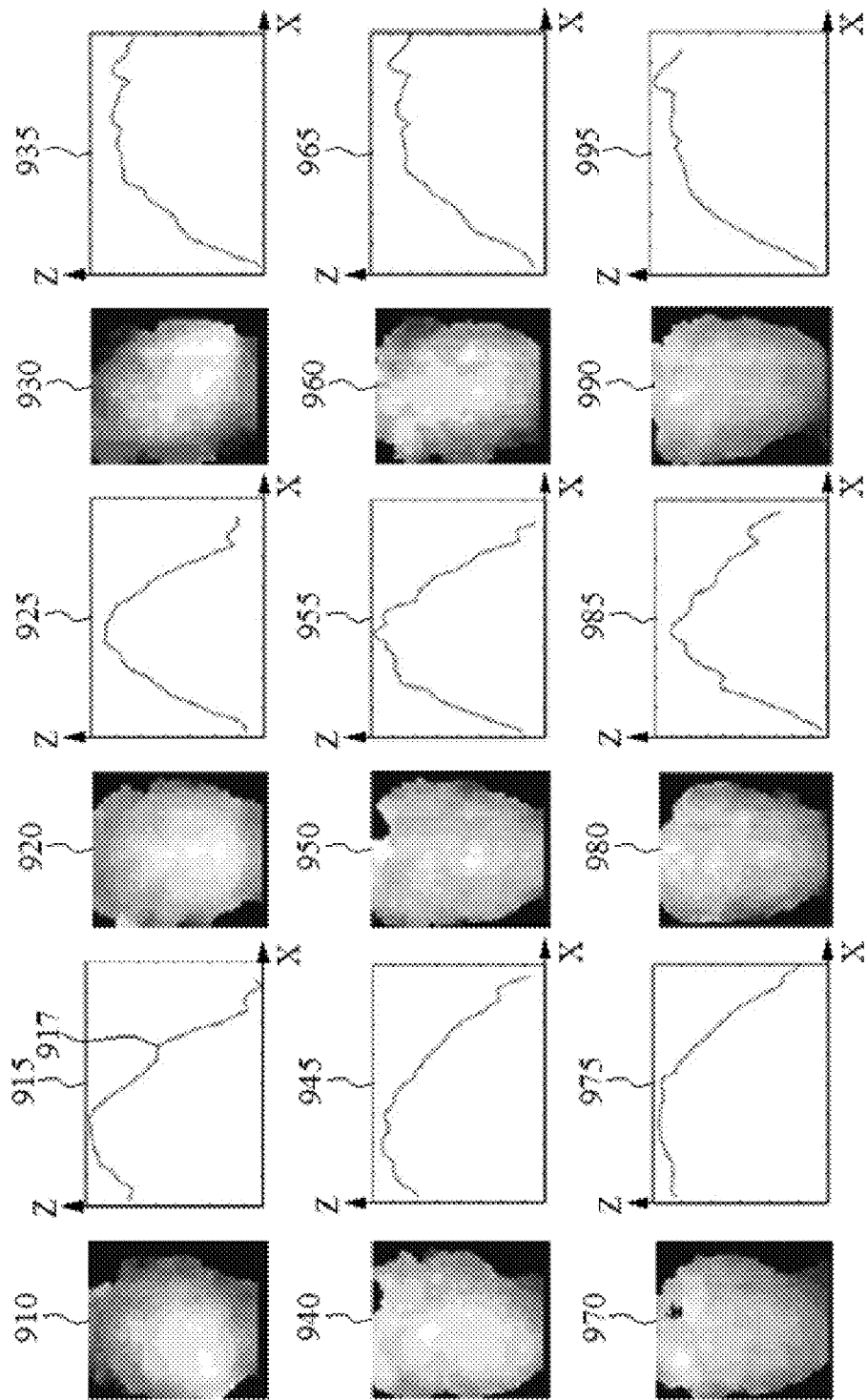
FIG. 9 illustrates an extracted head yaw line according to an exemplary embodiment.

FIG. 9 illustrates the extracted head yaw line according to an exemplary embodiment.

Depth images 910, 920, 930, 940, 950, 960, 970, 980, and 990 of FIG. 9 correspond, respectively, to the depth images 610, 620, 630, 640, 650, 660, 670, 680, and 690 of FIG. 6. In FIG. 9, the depth images 910, 920, and 930 in a first row correspond to a case in which the head is raised. The depth images 940, 950, and 960 in a second row correspond to a case in which the head looks ahead, that is, in which the head is neither raised nor lowered. The depth images 970, 980, and 990 in a third row correspond to a case in which the head is lowered. In FIG. 9, the depth images 910, 940, and 970 in a first column correspond to a case in which the head is deflected in a rightward direction. The depth images 920, 950, and 980 in a second column correspond to a case in which the head looks straight without being deflected in a leftward direction or in a rightward direction. The depth images 930, 960, and 990 in a third column correspond to a case in which the head is deflected in a leftward direction. Accordingly, the depth image 910 corresponds to a case in which the head is raised while being deflected in a rightward direction. The depth image 920 corresponds to a case in which the head is raised while looking straight without being deflected in a leftward direction or in a rightward direction. The depth image 930 corresponds to a case in which the head is raised while being deflected in a leftward direction. The depth image 940 corresponds to a case in which the head looks ahead, that is, in which the head is neither raised nor lowered and is thus parallel to the horizon, while being deflected in a rightward direction. The depth image 950 corresponds to a case in which the head looks ahead, that is without being raised or lowered, and straight, that is, without being deflected in a leftward direction or in a rightward direction. The depth image 960 corresponds to a case in which the head looks ahead while being deflected in a leftward direction. The depth image 970 corresponds to a case in which the head is lowered while being deflected in a rightward direction. The depth image 980 corresponds to a case in which the head is lowered while looking straight without being deflected in a leftward direction or in a rightward direction. The depth image 690 corresponds to a case in which the head is lowered while being deflected in a leftward direction.

In FIG. 9, a graph 915 represents a head yaw line 917 corresponding to the depth image 910. A graph 925 represents a head yaw line corresponding to the depth image 920. A graph 935 may represent a head yaw line corresponding to the depth image 930. A graph 945 may represent a head yaw line corresponding to the depth image 940. A graph 955 may represent a head yaw line corresponding to the depth image 950. A graph 965 may represent a head yaw line corresponding to the depth image 960. A graph 975 may represent a head yaw line corresponding to the depth image 970. A graph 985 may represent a head yaw line corresponding to the depth image 980. A graph 995 may represent a head yaw line corresponding to the depth image 990.

Accordingly, the graphs 915, 945, 975 in the first column represent the head yaw line corresponding to the depth images 910, 940, 970 in which the head is deflected in a rightward direction. The graphs 925, 955, and 985 in the second column represent the head yaw line corresponding to the depth images 920, 950, and 980 in which the head looks straight, respectively. The graphs 935, 965, 995 in the third column represent the head yaw line corresponding to the depth images 930, 960, and 990 in which the head is deflected in a leftward direction.

As shown in FIG. 9, the graphs 915, 945, 975 in the first column represent the extracted head yaw line when the head is deflected in a rightward direction, and demonstrate that the depth is changed along the X axis, for example, a distance between a left cheek and the photographing device being shorter than a distance between a right cheek and the photographing device.

In the graphs 915, 925, 935, 945, 955, 965, 975, 985, and 995 of FIG. 9, the X axis denotes the horizontal direction of the head and the Z axis denotes the depth value. A smaller value of the Z axis represents a rightward direction with respect to the horizontal direction of the head, for example, a direction facing the right cheek, and a larger value of the Z axis represents a leftward direction with respect to the horizontal direction of the head, for example, a direction facing the left cheek. In FIG. 9, the graphs 915, 945, and 975 correspond to a case in which the head is deflected in a rightward direction, and represents a smaller depth value along the X axis. For example, in a case in which the head is deflected in a rightward direction, the depth value is reduced as the value of the X axis is increased. In a case in which the head is deflected in a rightward direction, a distance from the photographing device is reduced in a left-to-right direction with respect to the horizontal direction of the head.

In this instance, referring to the graphs 915, 945, and 975, it may be found that the head yaw line changes modestly with the pitch up and down of the head.

The graphs 925, 955, and 985 in the second column represent the extracted head yaw line when the head looks straight, and demonstrate that the depth has symmetry with respect to the Y axis, for example, that a depth of the left cheek and a depth of the right cheek appear to be symmetrical. The graphs 935, 965, and 995 in the third column represent the extracted head yaw line when the head is deflected in a leftward direction, and demonstrate that the depth is changed along the X axis, for example, the right cheek being closer to the photographing device than the left cheek.

The yaw line extracting unit 310 may extract a yaw line of a lower half of the face to be the head yaw line, absent consideration of yaw of an upper half of the face, because the lower half of the face represents a degree of yaw more accurately when the head is deflected.

Also, when the head yaw line is extracted in the head area by the yaw line extracting unit 310, the yaw line extracting unit 310 may determine a number of head image points located along the edge of the cheek, and when the determined number of head image points is less than a preset threshold value, may remove the corresponding head image points from the head area. Using the foregoing method, noise points along the edge of the cheek may be removed effectively and effectiveness of the extracted head yaw line may be improved.

When the head yaw line is extracted in the head area by the yaw line extracting unit 310, the yaw angle calculating unit 320 may obtain a head yaw angle by determining a degree of deviation of a depth of focus from the center of the head based on the yaw line of the head.

The depth of focus may refer to a focus of each image point along the depth in the head area, and the center of the head may represent a geometric centre of the head. In an exemplary embodiment, when determining the head yaw angle, only the depth of focus along the horizontal direction and coordinates of the center of the head may be taken into account.

Accordingly, the yaw angle calculating unit 320 may determine the depth of focus $C_s$ of the head and the center $C_l$ of the head, for example, the geometric centre of the head, based on Equation 4.

$$C_g(x) = \frac{\sum_{m=1}^{M} D(m) \cdot x_m \cdot r}{\sum_{m=1}^{M} D(m)}$$

$$C_l(x) = \frac{\sum_{m=1}^{M} x_m}{M}$$

[Equation 4]

Here, $C_g(x)$ denotes a numerical value of coordinates of the depth of focus along the horizontal direction, for example, the x axis. $C_l(x)$ denotes a numerical value of coordinates of the center of the head along the horizontal direction, for example, the x axis. M denotes M points constituting the head yaw line. D(m) denotes a depth of an m-th point among the M points. $x_m$ denotes a location of the m-th point along the horizontal direction. r denotes a scaling factor, and may resolve a unit of measure inconsistency between the depth and the horizontal location of the m-th point. Generally, when a depth of an object being photographed is obtained, the depth may be represented by a physical depth and a location of each point in an image may be represented by a pixel distance. For example, in this case, magnitudes of units of measure for the depth and the horizontal location may differ. In a case in which a physical location of each point in a face image may be obtained directly from a depth camera, a need for the scaling factor r may be eliminated or the scaling factor r may be set to 1.

When the depth of focus $C_s$ of the head and the center $C_l$ of the head is determined through the yaw angle calculating unit 320, the yaw angle calculating unit 320 may obtain a head yaw angle based on a degree of deviation of the depth of focus $C_g$ of the head from the center $C_l$ of the head.

Figure 10:
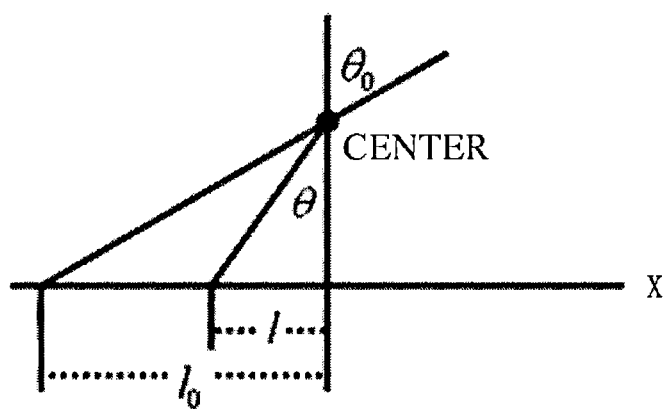
FIG. 10 illustrates an example of calculating a head yaw angle according to an exemplary embodiment.

Hereinafter, a processing operation of the yaw angle calculating unit 320 calculating the head yaw angle is described with reference to FIG. 10. FIG. 10 illustrates an example of calculating a head yaw angle according to an exemplary embodiment.

As the example shown in FIG. 10, the head yaw angle φ may represent a degree of deviation of the depth of focus $C_g$ from the head center $C_l$. In an exemplary embodiment, only the depth of focus $C_g$ along the horizontal direction and yaw from the head center $C_l$ may be considered. Accordingly, the yaw angle calculating unit 320 may calculate the head yaw angle φ based on Equation 5.

$$\phi = a\operatorname{ctan}\left(\frac{h \cdot \tan(\phi_0)}{h_0}\right)$$

[Equation 5]

Here, h denotes a yaw distance corresponding to the head yaw angle φ, and may be represented by $h = C_g(x) - C_l(x)$. $\phi_0$ denotes a pre-obtained head yaw angle, and $h_0$ denotes a yaw distance corresponding to the pre-obtained head yaw angle $\phi_0$. Here, a specific numerical value of $\phi_0$ and $h_0$ may be obtained based on experience or through experimentation.

The head yaw angle estimating unit 30 according to an exemplary embodiment is not limited to the above detailed structure and operations. Any method of estimating a head yaw angle in a head area for resolving a technical issue may be applied to exemplary embodiments.

When the head yaw angle φ is calculated through the yaw angle calculating unit 320, referring to FIG. 2 again, in operation 400, the head pose displaying unit 40 may display a head pose based on the estimated head pitch angle and the estimated head yaw angle.

For example, the head pose displaying unit 40 may obtain a corresponding 3D head pose by operating a 3D model in a pitch direction or a yaw direction, or both, based on the estimated head pitch angle and the estimated head yaw angle.

Figure 11:
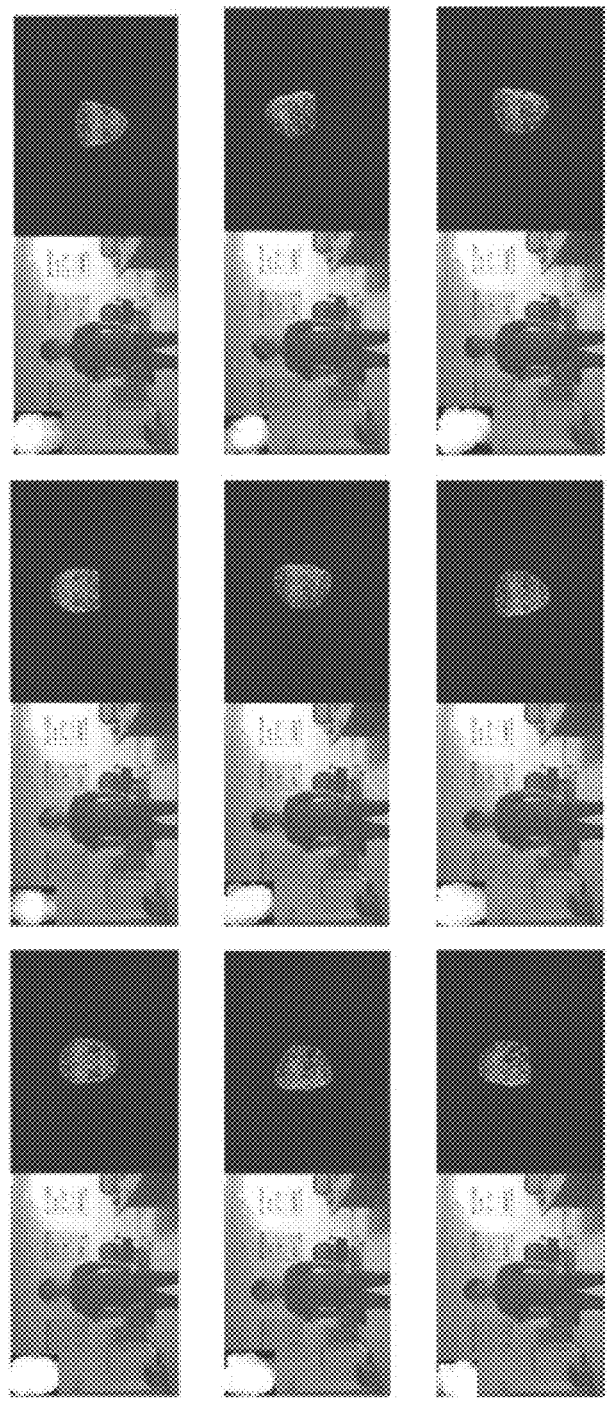
FIG. 11 illustrates an example of displaying a head pose according to an exemplary embodiment.

FIG. 11 illustrates an example of displaying a head pose according to an exemplary embodiment. As shown in FIG. 11, the device for estimating a head pose according to an exemplary embodiment may obtain a corresponding 3D head pose by operating a 3D model using the estimated head pitch angle and the estimated head yaw angle, after the head area is detected in the depth image of the human body.

Figure 12:
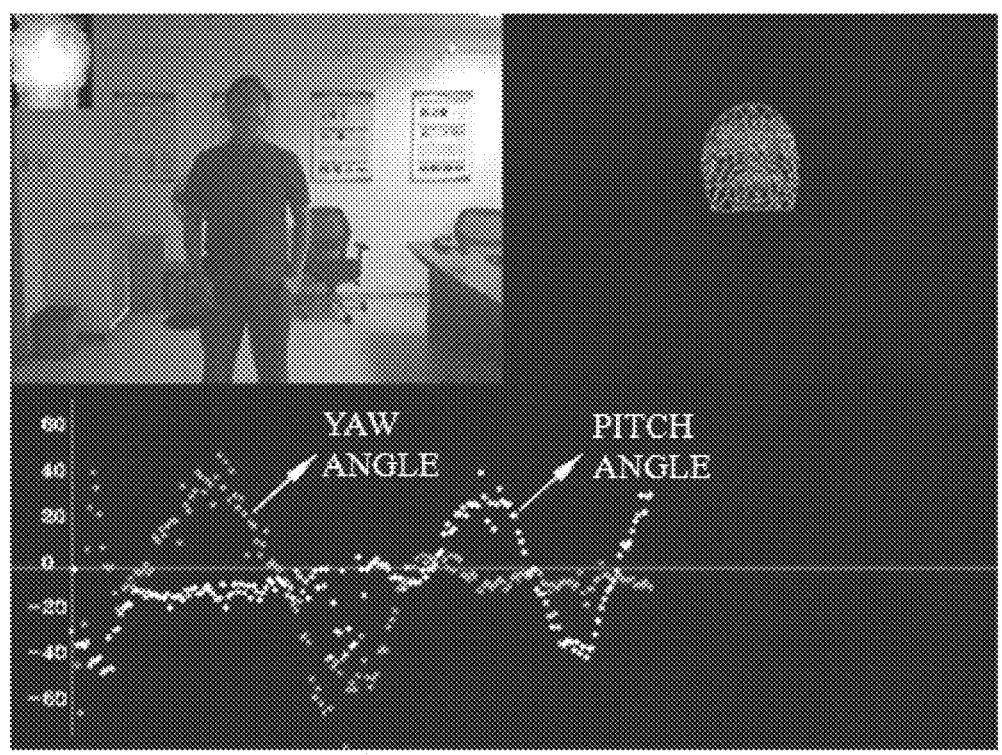
FIG. 12 illustrates another example of displaying a head pose according to an exemplary embodiment.

According to exemplary embodiments, the method of FIG. 2 may further include an additional operation. The head pose displaying unit 40 may display the head pose. The head pose displaying unit 40 may output the head pose as shown in FIG. 12. Referring to FIG. 12, the head pose displaying unit 40 may output a photographed color image, a depth image, and a curve chart of corresponding head yaw angle and head pitch angle, as well as displaying the head pose.

According to the device and method described above, the head pose may be estimated based on a depth image, free from the influence of any change in illumination. Also, an excellent recognition result may be obtained by operating a 3D model using a head pitch angle and a head yaw angle, and even in a case in which a distance is long or a resolution is reduced, an accurately recognized pose may be obtained. Also, the device and method for estimating a head pose according to an exemplary embodiment may meet the demand in real time through simple calculation.

The device and method for estimating a head pose according to an exemplary embodiment may be applied to various design plans. For example, the device and method may be used in a human computer interaction (HCI) device. The device may correspond to an assembled electronic product, for example, a set-top box, a smart TV, a game console, a 3D TV, a mobile device, and the like, and may correspond to an integrated HCI control chip that may be installed in a corresponding device.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a hardware-based general purpose computer or processor or may be executed on a particular machine such as the device for estimating a head pose described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A device for estimating a head pose, the device comprising:
    a processor configured to control one or more processor-executable units;
        a head area extractor configured to extract a head area comprising a head from an input depth image, the head area extractor comprising:
            a head detector configured to detect the head area from the input depth image based on a depth feature of the head; and
            a background remover configured to remove a background part from the detected head area based on a depth difference between the head and the background part;
        a head pitch angle estimator, comprising:
            a pitch line extractor configured to extract a pitch line of the head;
            a filter configured to classify the pitch line into sections and to obtain a straight line in a section of the sections having a highest fitting probability;
            a pitch angle calculator configured to calculate a pitch angle of the head based on the straight line;
        a head yaw angle estimator configured to estimate a yaw angle of the head in the head area; and
        a head pose displayer configured to display a head pose based on the calculated pitch angle of the head and the estimated yaw angle of the head.

2. The device of claim 1, wherein the head area extractor further comprises:
    a head area elaboration processor configured to perform elaboration processing of the background part-removed head area based on an outline feature of the head.

3. The device of claim 1, wherein the pitch line of the head is configured to indicate a depth of the head along a vertical direction in an extracted head area, and the pitch angle of the head is calculated to be an angle at which the straight line is offset from a vertical direction.

4. The device of claim 3, wherein the straight line in the section of the sections comprising the highest fitting probability is obtained based on a RANdom Sample Consensus (RANSAC) algorithm.

5. The device of claim 1, wherein the head yaw angle estimator comprises:
    a yaw line extractor configured to extract a yaw line of the head indicating a depth of the head along a horizontal direction in an extracted head area; and
    a yaw angle calculator configured to obtain a yaw angle of the head by determining a degree of deviation of a depth of focus from a center of the head based on the yaw line of the head.

6. The device of claim 1, wherein the head pose displayer is further configured to obtain a corresponding three-dimensional (3D) head pose by operating a 3D model in a pitch direction or a yaw direction, or both, based on the pitch angle of the head and the yaw angle of the head.

7. The device of claim 1, wherein the input depth image is generated by a time of flight camera or a camera based on structured light.

8. A method for estimating a head pose, the method comprising:
    extracting a head area from an input depth image generated by a time-of-flight camera or a camera based on structured light, the extracting comprising:
        detecting the head area from the input depth image based on a depth feature of the head; and
        removing a background part from the detected head area based on a depth difference between the head and the background part;
    estimating a pitch angle of a head in the head area, the estimating comprising:
        extracting a pitch line of the head;
        classifying the pitch line into sections;
        obtaining a straight line in a section of the sections having a highest fitting probability;
        calculating a pitch angle of the head based on the straight line;
    estimating a yaw angle of the head in the head area; and
    displaying, by way of a processor, a head pose based on the estimated pitch angle of the head and the estimated yaw angle of the head.

9. The method of claim 8, wherein the extracting of the head area further comprises:
    performing elaboration processing of the background part-removed head area based on an outline feature of the head.

10. The method of claim 8, wherein the pitch line of the head is configured to indicate a depth of the head along a vertical direction in an extracted head area, and the pitch angle of the head is calculated to be an angle at which the straight line is offset from a vertical direction.

11. The method of claim 10, wherein the straight line in the section of the sections comprising the highest fitting probability is obtained based on a RANdom Sample Consensus (RANSAC) algorithm.

12. The method of claim 8, wherein the estimating of the yaw angle of the head comprises:
    extracting a yaw line of the head indicating a depth of the head along a horizontal direction in an extracted head area; and obtaining a yaw angle of the head by determining a degree of deviation of a depth of focus from a center of the head based on the yaw line of the head.

13. The method of claim 8, wherein the displaying of the head pose based on the estimated pitch angle of the head and the estimated yaw angle of the head comprises obtaining a corresponding three-dimensional (3D) head pose by operating a 3D model in a pitch direction or a yaw direction, or both, based on the pitch angle of the head and the yaw angle of the head.

14. The method of claim 8, wherein the input depth image is generated by a time of flight camera or a camera based on structured light.

15. A head pose estimating apparatus, comprising:
 a processor configured to control one or more processor-executable units;
 a head area extractor configured to extract a head area comprising a head from an input depth image, the head area extractor comprising:
  a head detector configured to detect the head area from the input depth image based on a depth feature of the head, and
  a background remover configured to remove a background part from the detected head area based on a depth difference between the head and the background part;
 a head pitch angle estimator, comprising:
  a pitch line extractor configured to extract a pitch line of the head;
  a fitter configured to classify the pitch line into sections and to obtain a straight line in a section of the sections having a highest fitting probability;
  a pitch angle calculator configured to calculate a pitch angle of the head based on the straight line;
 a head yaw angle estimator configured to estimate a yaw angle of the head in the head area; and
 a head pose displayer configured to display a three-dimensional (3D) head pose by operating a 3D model in a pitch direction and a yaw direction based on the pitch angle of the head estimated by the head pitch angle estimator and the yaw angle of the head estimated by the head yaw angle estimator.

16. The apparatus of claim 15, wherein the input depth image is generated by a time of flight camera or a camera based on structured light.

* * * * *